United States Patent [19]

Miyaki et al.

[11] Patent Number: 4,475,507
[45] Date of Patent: Oct. 9, 1984

[54] FUEL INJECTION AMOUNT CONTROL

[75] Inventors: Masahiko Miyaki, Oobu; Akira Masuda; Toshimi Matsumura, both of Aichi, all of Japan

[73] Assignee: Nippondenso Co., Ltd., Kariya, Japan

[21] Appl. No.: 514,608

[22] Filed: Jul. 18, 1983

[30] Foreign Application Priority Data

Jul. 21, 1982 [JP] Japan .................................. 57-127365
Jul. 23, 1982 [JP] Japan .................................. 57-129224

[51] Int. Cl.³ ............................................ F02D 1/04
[52] U.S. Cl. ............................ 123/357; 123/458; 123/459
[58] Field of Search ............... 123/357, 358, 359, 458, 123/459

[56] References Cited

U.S. PATENT DOCUMENTS 3,851,635 12/1974 Murtin et al. ...................... 123/458
3,880,131 4/1975 Twaddell et al. ................... 123/458
4,279,229 7/1981 Arnold et al. ....................... 123/357
4,343,274 8/1982 Butscher ............................. 123/357
4,395,987 8/1983 Kobayashi et al. ................. 123/458
4,423,485 12/1983 Sami et al. .......................... 123/357

FOREIGN PATENT DOCUMENTS 2061403 5/1981 United Kingdom ................ 123/357
2094504 9/1982 United Kingdom ................ 123/357

Primary Examiner—Magdalen Y. C. Moy
Attorney, Agent, or Firm—Cushman, Darby & Cushman

[57] ABSTRACT

In a fuel injection system having a fuel injection pump of distribution type with an electromagnetic valve controlling the communication between a spill port and a lower pressure fuel chamber, the closing duration of the electromagnetic valve is controlled by a computer so that the closing duration is defined as the sum of pre-stroke time and actual injection time which are both prestored in one or more memories. The actual injection time is controlled in accordance with engine operating condition, while the prestroke time may also be controlled by manually setting the same or by way of a feedback control. The sum, which defines the closing duration of the electromagnetic valve, may be limited by a maximum value, which may be manually adjustable, so as to prevent excessive fuel flow. The prestroke time may be uniformly controlled through all the cylinders or may be independently controlled for respective cylinders.

18 Claims, 13 Drawing Figures

FUEL INJECTION AMOUNT CONTROL

BACKGROUND OF THE INVENTION

This application is related to co-pending application Ser. No. 482,884 filed on Apr. 7, 1983 by Matsumura et al, and assigned to Nipondenso Co. Ltd. and another co-pending application Ser. No. 501,789 titled "Fuel Injection Pump Having a Compact Spill-Port Timing Control Unit" filed on June 7, 1983 by the same inventors as the present application and assigned to Nippondenso Co. Ltd.

This invention relates generally to fuel injection for internal combustion engines, and more particularly, the present invention relates to apparatus and method for controlling amount of fuel injected by a fuel injection pump of distribution type.

In conventional fuel injection pumps of distribution type which are used mainly for diesel engines, the fuel flow is controlled by changing an effective compressing stroke of a plunger of the pump by moving axially a ring-like member, which selectively opens a spill port, by way of a mechanical governer. However, when it is intended to electronically control the amount of fuel supplied to the engine, the position of the ring-like member has to be accurately and precisely controlled when such a conventional fuel injection pump is employed. Accordingly, such an electronically controlled fuel injection pump requires a high-grade actuator, a position sensor and the like, resulting in complex structure and high manufacturing cost.

A new type fuel injection pump was divised in order to remove such drawbacks. This new fuel injection pump does not employ the above-mentioned ring-like member or high-grade actuator, but comprises an electromagnetic valve which makes compressed fuel spill or escape to terminate fuel injection. Such a new fuel injection pump comprising an electromagnetic valve is disclosed in U.S. Pat. No. 3,880,131.

According to such a new fuel injection pump, however, the valve-closing duration, for which the spill port is being blocked, has not been necessarily controlled in a desired manner, and therefore, the amount of fuel cannot be satisfactorily controlled.

SUMMARY OF THE INVENTION

The present invention has been developed in order to remove the above-described drawbacks inherent to the conventional fuel injection pump having an electromagnetic valve with which compressed fuel is spilled to terminate injection thereby controlling the fuel flow to engine cylinders.

It is, therefore, an object of the present invention to provide new and useful apparatus and method with which fuel flow is satisfactorily controlled.

According to a feature of the present invention the closing duration of the electromagnetic valve of the injection pump is controlled such that the closing duration or time length is divided into two; one being prestroke time or lead time, and the other being actual injection time. These two duration data are respectively prestored in one or two memories and read out to correct the same if necessary, and the closing duration of the electromagnetic valve is controlled so that a desired amount of fuel is fed to the cylinders of the engine.

The actual injection time is determined so as to supply the engine with appropriate amount of fuel in accordance with engine operating condition. The prestroke time may be either manually adjusted or controlled by way of a feedback control. The prestroke time and the actual injection time, which are respectively stored in the form of time data or engine crankshaft rotational angle data, are added to each other to obtain a sum which will be compared with a successively increasing variable, such as the lapse of time or the rotational angle of the engine crankshaft from the instance of the closure of the electromagnetic valve. When the variable equals or exceeds the sum, the electromagnetic valve is opened to terminate fuel injection. The prestroke time may be uniformly controlled throughout all the cylinders or may be differently controlled for respective cylinders. The closing duration may be limited by a maximum value for preventing excessive flow of fuel, where the maximum value may also be manually adjusted.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
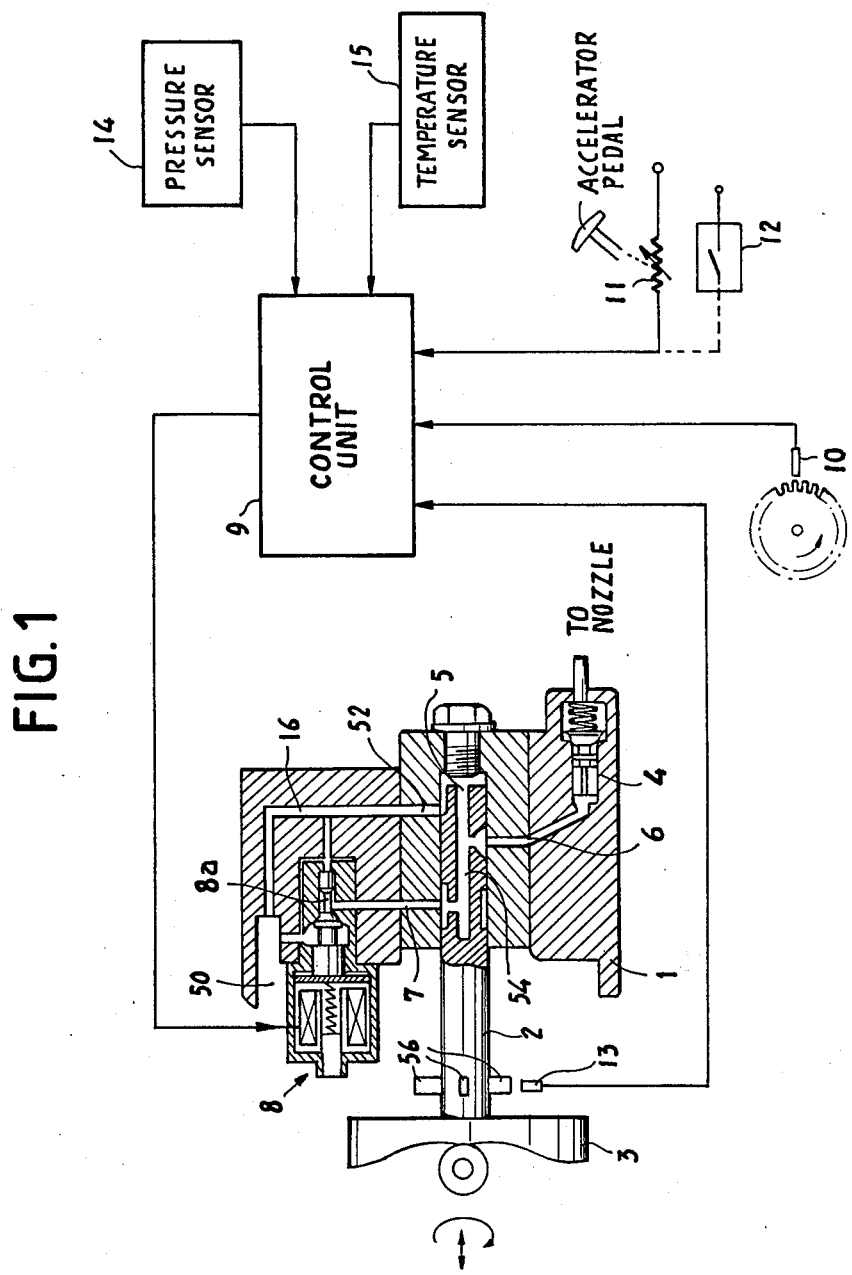
FIG. 1 is a schematic diagram of the apparatus according to the present invention.

Referring to FIG. 1, a schematic diagram of the apparatus according to the present invention is shown. The apparatus generally comprises a fuel injection pump 1 of distribution type, and a control unit 9, which may be actualized by a computer as will be described later. The fuel injection pump 1 is partially illustrated by way of a partial cross-sectional view. The fuel injection pump 1 comprises a rotary shaft or plunger 2 which is coupled via a surface cam 3 to an unshown internal combustion engine crankshaft. As is well known in the art, the rotational force of the engine crankshaft is transmitted to the plunger 2 so that the plunger 2 rotates and reciprocally moves. Fuel is arranged to be fed from a fuel source via an unshown feed pump to an inlet chamber 50. The fuel is led via a passage 16 and an intake port 52 to a compression or pumping chamber 5 which is defined between the tip portion of the plunger 2 and a closed end of a bore receiving the plunger 2. The fuel led into the compression chamber 5 is compressed when the plunger 2 moves right in the drawing against a force of an unshown spring. At this time the intake port 52 is closed so that compressed fuel is led via a passage made within the plunger 2 to one of delivery passages 6 (only one being shown for simplicity). Each delivery passage 6 communicates via a delivery valve 4, which basically functions as a check valve, with a corresponding fuel injection nozzle (not shown) provided for each cylinder.

In addition to the above structure, an electromagnetic valve 8 is provided for selectively establishing communication between a spill port 7 and the inlet chamber 50. The spill port 7 is arranged to communicate via a passage provided within the plunger 2 with the compression chamber 5. The electromagnetic valve 8 comprises a spool valve 8a arranged to move reciprocally when the electromagnetic valve 8 is energized and deenergized. In detail, when the electromagnetic valve 8 is energized the spool valve 8a moves right in the drawing so that the communication between the spill port 7 and the inlet chamber 50 is cut off. As a result, fuel in the spill port 7 is blocked.

The fuel in the inlet chamber 50 is fed from the fuel source via the above-mentioned feed pump so that the fuel in the inlet chamber 50 is under a predetermined pressure. However, this pressure is much lower than the pressure of the fuel in the compression chamber 5 when the plunger 2 moves right. Therefore, when the electromagnetic valve 8 is closed the fuel is delivered through the delivery ports 6 under a high pressure to be injected into an appropriate cylinder. When the electromagnetic valve 8 opens on energization of the same, the fuel in the inner passage 54 of the plunger 2 escapes via the spill port 6 to the inlet chamber 50 lowering the pressure in the inner passage 54 and the compression chamber 5. As a result, fuel injection is terminated.

Since an outlet of the inner passage 54 communicates with each of the delivery passages 6 once per a revolution of the plunger 2, compressed fuel is injected into respective cylinders one after another in synchronism with engine rotation. The embodiments of the present invention will be described taking an exmple of a four-cylinder engine. Therefore, the plunger 2 makes a full turn (360 degrees) when the engine crankshaft rotates twice (720 degrees). Furthermore, the plunger 2 makes reciprocal movement four times a revolution thereof.

The control unit 9, which will be described later in detail with reference to FIG. 4, controls the timing of energization and deenergization of the electromagnetic valve 8 in accordance with various input signals or data. An engine speed sensor 10 produces an output signal indicative of the rotational speed of the engine crankshaft, and sends the same to the control unit 9. The engine speed sensor 10 faces a gear teeth disk arranged to rotate in synchronism with the engine crankshaft so as to produce a pulse train. As is well known, the number of pulses per unit time represents the engine speed. Furthermore, since the number of all the gear teeth is predetermined and known, the number of pulses represents the rotational angle of the engine crankshaft.

An accelerator pedal position sensor 11 produces an output signal indicative of the position of the accelerator pedal for representing the load of the engine. An idling position sensor 12 produces a signal indicating that the engine is in idling condition. Both the accelerator pedal position sensor 11 and the idling sensor 12 are associated with the accelerator pedal as shown, and send their output signals to the control unit 9. A bottom-dead center sensor 13 is provided to detect the bottom-dead point of the plunger 2. Namely, when the plunger 2 is moved to the left-most position in the drawing, an output signal from the bottom-dead center sensor 13 is fed to the control unit 9. Equiangularly spaced apart four gear teeth or projections 56 are provided to the circumference of the plunger 2, and the bottom-dead center sensor 13 is arranged to face each of the gear teeth when the plunger 2 rotates and is at the left-most position. In addition to these sensors, an atmospheric pressure sensor 14 and an engine coolant temperature sensor 15 are provided to supply the control unit 9 with various pressure and temperature information.

The control unit 9 receives these signals from various sensors and produces a driving current fed to the electromagnetic valve 8, or a control signal used for producing such a driving current, so that the electromagnetic valve 8 is closed when a bottom-dead center signal from the bottom-dead center sensor 13 is received. The control unit 9 computes and processes the engine load, engine speed, engine temperature, atmospheric pressure or the like so as to determine a suitable fuel flow or amount. Since the amount of fuel fed to engine cylinders is controlled by controlling the closing duration of the electromagnetic valve 8, the control unit 9 deenergizes the electromagnetic valve 8 when a duration corresponding to the suitable amount of fuel has elapsed. This duration, i.e. the closing duration of the electromagnetic valve 8, is controlled by the control unit 9 so as to control the fuel flow in a desired manner.

Figure 2:
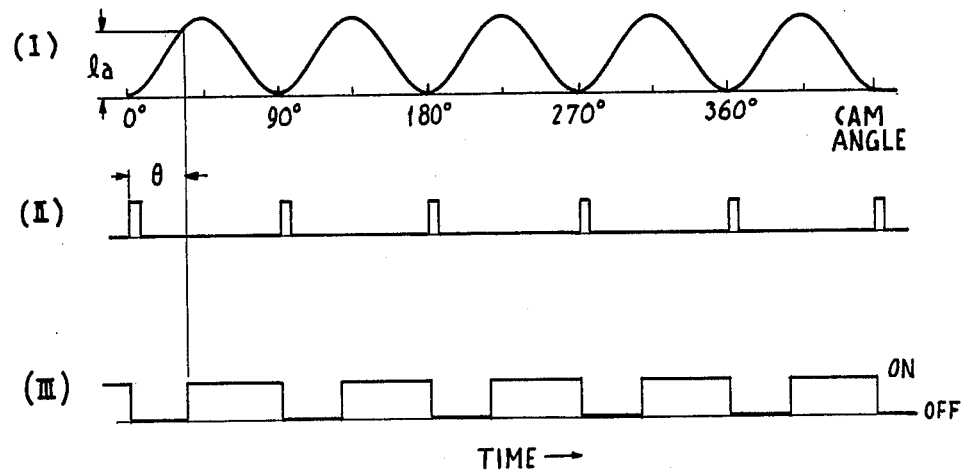
FIG. 2 is a timing chart showing the basic operation of the apparatus of FIG. 1.

FIG. 2 is a timing chart showing the way of controlling the amount of fuel fed to engine cylinders. A first waveform (I) shows the stroke of the plunger 2 with respect to the rotational angle of the surface cam 3. A second waveform (II) shows the above-mentioned bottom-dead center signal, and a third waveform (III) shows the driving current fed to the electromagnetic valve 8. The driving current is an on-off signal or a pulse train. The trailing edge of the negative-going pulse may be controlled so that the closing duration starting from the occurrence of the bottom-dead center signal can be controlled. Since fuel injection is effected only within this closing duration of the electromagnetic valve 8, an effective stroke $l_a$ of the plunger 2 varies depending on the closing duration. The reference $\theta_a$ represents the rotational angle of the engine crankshaft corresponding to the closing duration.

Figure 3:
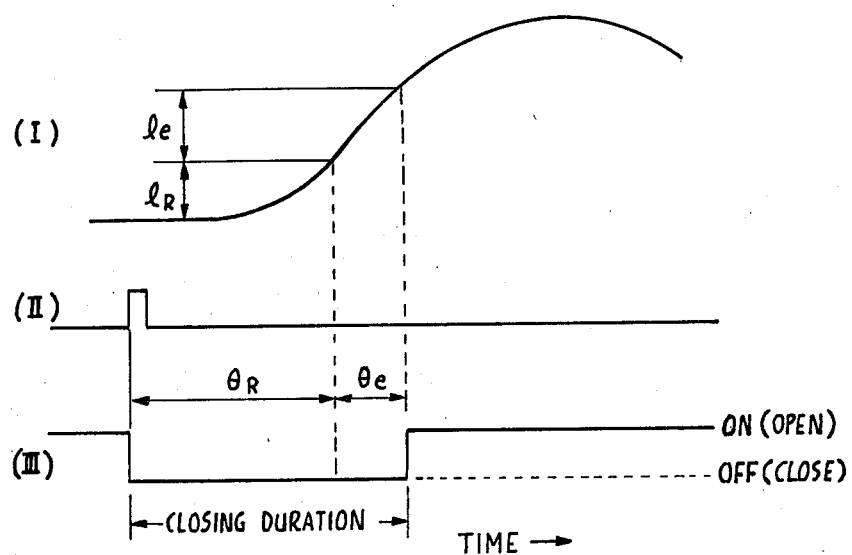
FIG. 3 is an enlarged view of FIG. 2, showing the idea of dividing the closing duration of the electromagnetic valve of FIG. 1 into two time lengths.

When the closing duration of the electromagnetic valve 8 is simply controlled as described in the above, there arises a problem as follows. This problem is caused from the fact that the closing duration does not equal the actual injection duration. Namely, as will be understood from FIG. 3, which is an enlarged timing chart of FIG. 2, the fuel in the fuel injection pump 1 is not injected immediately after the electromagnetic valve 8 is closed because of various reasons. One of the reasons is that the pressure in the compression chamber 5 is not high enough at the beginning of the closing duration, and another reason is that conduits leading to nozzles are not necessarily filled with fuel at the beginning of the closing duration. This duration indicated at $\theta_R$ in FIG. 3 is referred to as a prestroke time or lead time. Within this prestroke time, therefore, no fuel injection is effected. The prestroke time is followed by an actual injection time $\theta_e$ in which fuel is actually injected in an appropriate engine cylinder. Since this actual injection time $\theta_e$ determines the amount of fuel injected into engine cylinder, $\theta_e$ has to be controlled in order to precisely and idealy control the fuel flow so that maximum output is derived while desirable air-to-fuel ratio is set. In other words, unless the actual injection time $\theta_e$ is controlled, a complex processing is required such that the prestroke time $\theta_R$ is offset or subtracted from the closing duration to provide disirable control of fuel amount.

According to the present invention the above-mentioned two durations $\theta_R$ and $\theta_e$ forming the entire closing duration of the electromagnetic valve 8 are respectively treated. In detail, the prestroke time $\theta_R$ and the actual injection time $\theta_e$ are respectively stored in one or two memories and are read out to determine the time length of the closing duration after adjusting $\theta_R$ and/or $\theta_e$ when necessary.

Figure 4:
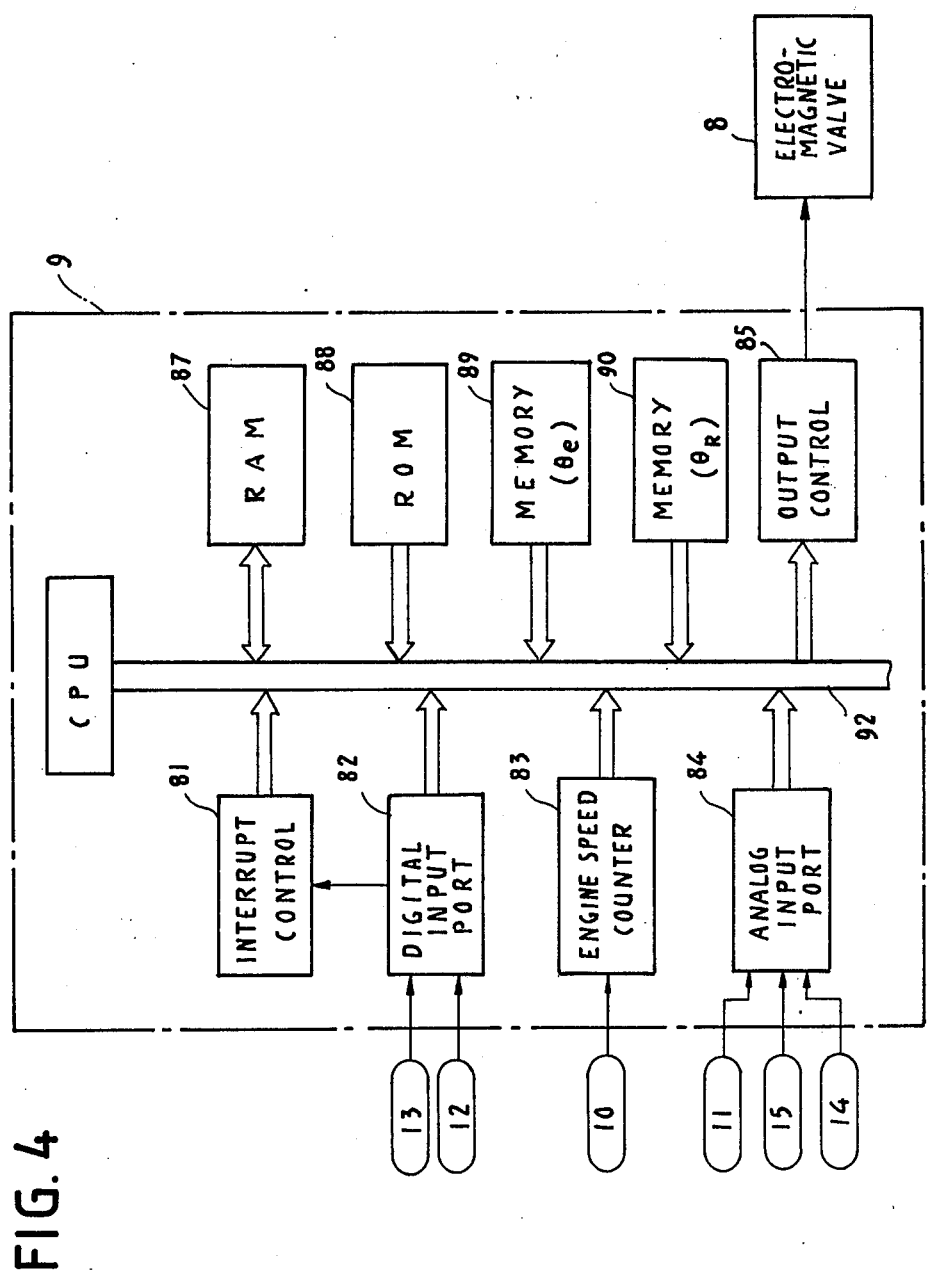
FIG. 4 is a schematic diagram of a computer used as the control unit of FIG. 1.

FIG. 4 shows a schematic diagram of a computer which is used as the control unit 9 of FIG. 1. Although the computer may be exclusively provided for controlling the electromagnetic valve 8 of FIG. 1, when a computer is employed to effect various controls, such as ignition timing control, air-conditioning control or the like, the same computer may be used by providing an appropriate program.

The computer 9 of FIG. 4 comprises basically, a central procesing unit 80 (CPU), for calculating the amount of fuel to be supplied to the engine in accordance with various information applied thereto, and memories 87, 88, 89 and 90. In addition the computer 9 comprises an analog input port 84, a digital input port 82, an output control device 85, a rotational speed measuring counter 83, and an interrupt control device 81. The counter 83 for measuring the number of rotations of the engine crankshaft is responsive to the output signal of the above-mentioned engine speed sensor 10 to count the number of pulses. The counter 83 has an output terminal connected to a common bus 92 to which all the circuits of the computer 9 is connected for sending/receiving data and/or instruction.

The digital input port 82 is provided for receiving digital signals from the bottom-dead center sensor 13 and from the idling switch 12. These digital signals are applied via the common bus 92 to the CPU 80. The analog input port 84, which is constructed of an analog multiplexer and an A/D converter, is used to convert analog signals from the accelerator pedal position sensor 11, the atmospheric pressure sensor 14, and from the coolant temperature sensor 15 in a sequence, and then to deliver the converted signals via the common bus 92 to the CPU 80.

An unshown power supply circuit receives electric power from a power source, such as a battery mounted on the motor vehicle having the engine to be controlled as its prime mover, so as to supply the above-mentioned various circuits of the computer 9 with regulated electrical power.

The memories comprises a read-only memory (ROM) 88, a random-access memory (RAM) 87, and another two read-only memories (ROM) 89 and 90. The first mentioned ROM 88 stores therein predetermined operational instructions which will be described later with reference to FIG. 5, so that the CPU 80 executes various steps in accordance with the operational instructions. The RAM 87 is used to temporarily store various data during the operations of the CPU 80. The RAM 87 may be continuously fed with electrical power from the power source so that data stored therein are not erased or cancelled although the ignition key of the engine is turned off to stop the engine operation. Namely, this RAM 87 is a battery-backed up memory.

The ROM 89 stores data of the above-mentioned actual injection time $\theta_e$ such that various data corresponding to various values of the engine load and engine speed are provided in the form of a map. The ROM 90 stores data of the above-mentioned prestroke time $\theta_R$. These data are prestored respectively in the ROMs 89 and 90 when manufacturing.

The counter 83 is arranged to be periodically reset to zero, and therefore produces data indicative of the number of pulses from the engine speed sensor 10. This data will be processed by the CPU 80 so as to measure the engine speed and the rotational angle of the engine crankshaft.

The aforementioned digital input port 82 produces an interrupt instruction signal, which is fed to the interrupt control unit 81 in turn, in response to the bottom-dead center signal. In response to the interrupt instruction the interrupt control unit 81 produces an interrupt signal so as to cause the CPU 80 to execute an interrupt service routine interrupting a running program.

The output control device 85 outputs the aforementioned driving current fed to the electromagnetic valve 8 in accordance with the result of calculation effected by the CPU 80. Namely, the pulse width of the driving current is controlled to adjust the closing duration of the electromagnetic valve 8 in a desired manner as will be described later.

Figure 5:
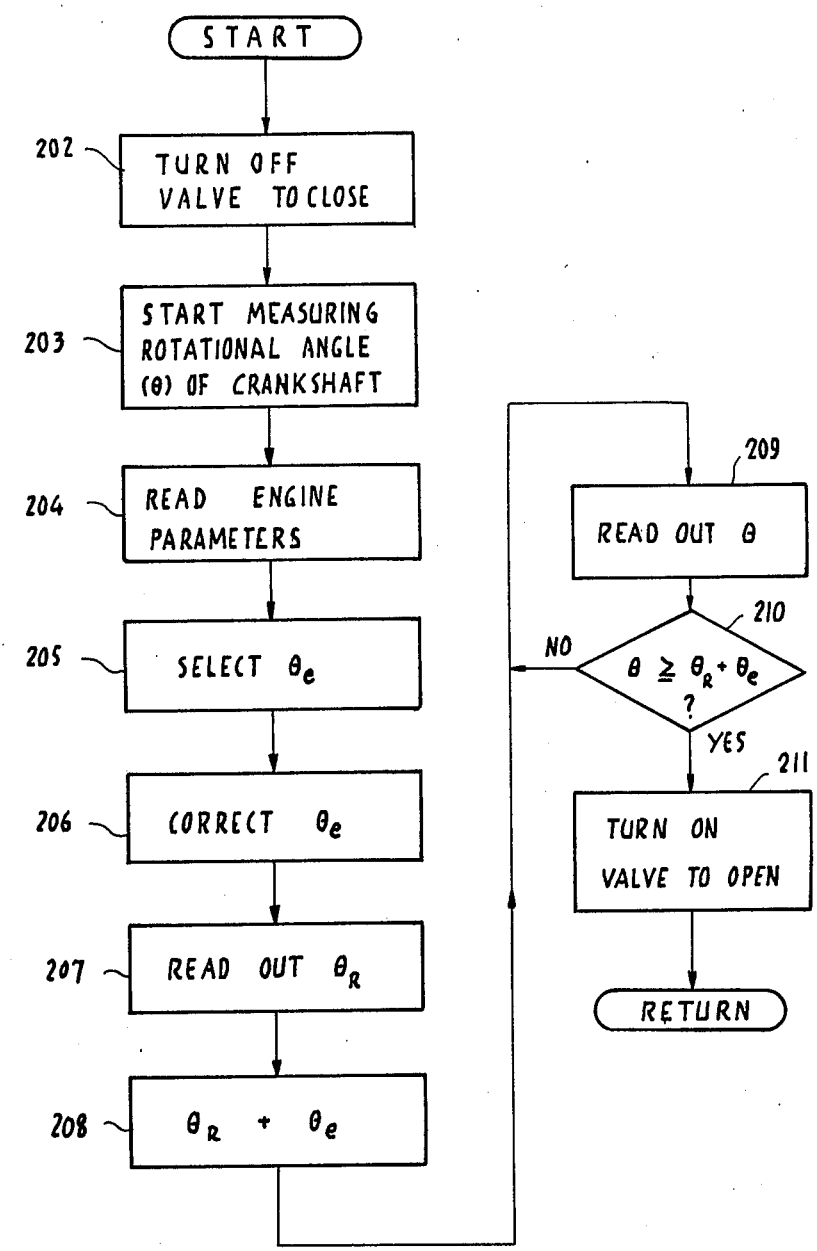
FIG. 5 is a flowchart showing a first embodiment of the invention.

FIG. 5 is a first embodiment flowchart showing brief operational steps of the CPU 80, and the function of the CPU 80 as well as the operation of the system of FIG. 4 will be described with reference to this flowchart. When the bottom-dead center signal is acknowledged, the interrupt control unit 81 causes the CPU 80 to execute the interrupt service routine of FIG. 5. At first in a step 202, namely immediately after the occurrence of the bottom-dead center signal, the electromagnetic valve 8 is deenergized so that the spool valve 8a cuts off the communication between the inlet chamber 50 and the spill port 7. This instant or timing is used as a reference angle or time, which corresponds to the beginning of the closing duration $\theta_R + \theta_e$ of the electromagnetic valve 8. In a following step 203, the engine speed measuring counter 83 is started to count the number pulses from the engine speed sensor 10. Since this number indicates the rotational angle $\theta$ of the engine cranshaft measured from the bottom-dead center of the plunger 2, and is in proportion to the lapse of time from the reference time, the lapse of time or rotational angle of the engine crankshaft is continuously detected. The detected data, which may be regarded as a successively increasing variable, may be stored in the RAM 87 such that this data increases as time goes.

Then in a step 204, data indicative of the accelerator pedal position, engine speed, engine coolant temperature, atmospheric pressure, is taken in. Namely, the data are written in the RAM 87. Among various data stored in the RAM 88, fundamental information for determining the fuel amount is read out in a following step so as to pick up a single data of the actual injection time $\theta_e$ suitable for the engine operating condition. In detail, the accelerator pedal position data indicative of the engine load, and the engine speed data are used to find and determine the actual injection time $\theta_e$ by selectively reading out the same from the ROM 89. Then in a following step 206, the value of $\theta_e$ is corrected in accordance with data of the coolant temperature and the atmospheric pressure read out from the RAM 87. In a step 207, the prestroke time $\theta_R$ is read out from the RAM 90, and is added to the actual injection time $\theta_e$ in a following step 208. This data obtained as the result of addition is referred to as sum time or sum angle, and this sum angle ($\theta_R + \theta_e$) is compared with the rotational angle $\theta$ of the crankshaft measured from the above-mentioned reference angle in a step 210 with the rotational angle $\theta$ being read out in a step 209. When the sum angle is smaller than the rotational angle $\theta$ of the crankshaft, the determination of the step 209 results in NO, and therefore, the steps 209 and 210 continuously take place until the sum angle ($\theta_R + \theta_e$) equals or exceeds the rotational angle $\theta$. As soon as the determination in the step 210 turns YES, a step 211 is executed to deenergize the electromagnetic valve 8. As a result, the electromagnetic valve 8 opens allowing the fuel in the spill port 7 to escape therethrough so that injection terminates.

From the above it will be understood that the closing duration of the electromagnetic valve 8 is controlled by using prestored angle or time data $\theta_R$ and $\theta_e$, which are added to each other first and the sum angle is compared with the actual rotational angle $\theta$ of the crankshaft to determine the end of the closing duration. Thus, accurate determination of the fuel amount fed to engine cylinders is actualized.

Figure 6:
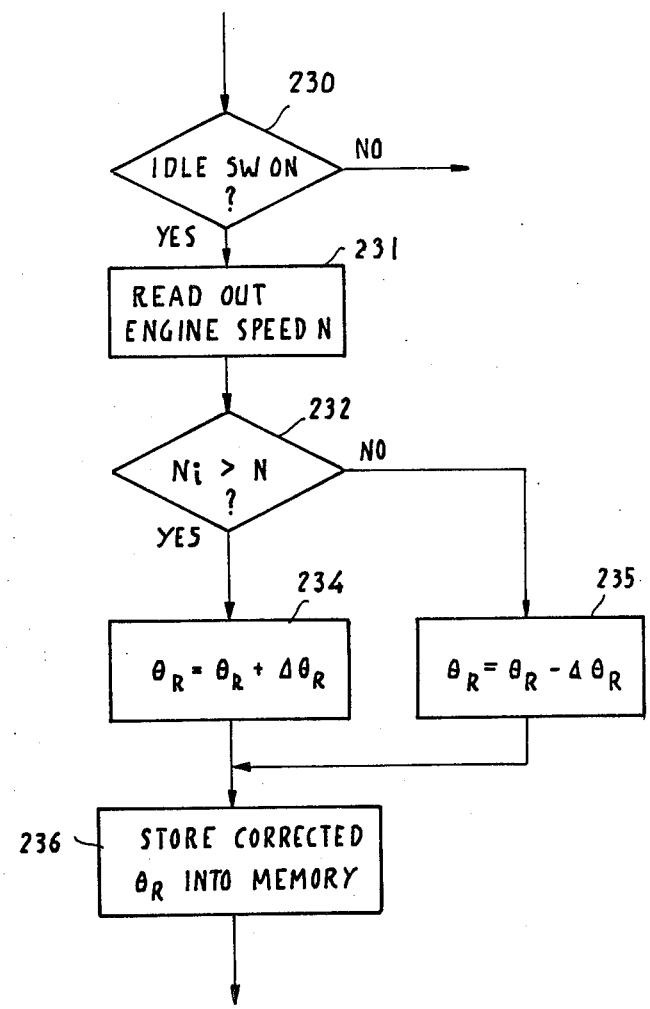
FIG. 6 is a flowchart showing a second embodiment of the invention.

A second embodiment of the present invention will be described with reference to FIG. 6. In this embodiment, the prestroke time $\theta_R$ is stored in a RAM rather than the ROM 90 so that the value of the prestroke time $\theta_R$ can be changed when necessary. Namely, a RAM is used as the memory 90 of FIG. 4. However, if desired, the data of prestroke time $\theta_R$ may be prestored in a ROM and is changed by using the memory 87 (RAM). A flowchart of FIG. 6 shows several steps used to feedback control the value of the prestroke time $\theta_R$ read out from the RAM 90. Namely, the steps of FIG. 6 may be added to the steps of FIG. 5 such that the steps of FIG. 6 are interposed between the step 207 and 208. Assuming that the steps of FIG. 5 are added to FIG. 6 in the above-mentioned manner, after the step 207, a step 230 is executed to check whether the idling switch 12 has been turned on. In the case that the idling switch 12 is in on state, indicating that the engine is in idling condition, the following steps 231 through 236 are executed. On the other hand, if the idling switch 12 is in on state, these steps 231 through 236 are skipped to execute the step 208 in the same manner as in the first embodiment of FIG. 5.

Assuming that the determination in the step 230 is YES, engine speed data N is read out from the RAM 87 in a step 231. Then this engine speed N is compared with a predetermined desirable idling engine speed Ni. When the actual engine speed N is greater than Ni, a step 235 is executed to decrease the prestroke time $\theta_R$ by a small predetermined value $\Delta\theta_R$. On the other hand, when the actual engine speed N is smaller than Ni, a step 234 is executed to increase the prestroke time $\theta_R$ by the small predetermined value $\Delta\theta_R$. The step 235 is provided so that the amount of fuel is decreased to lower the idling engine speed, whereas the step 234 is provided so that the amount of fuel in increased to raise the idling engine speed. Namely, the change in the prestroke time $\theta_R$ results in the change in the total closing duration of the electromagnetic valve so that the amount of fuel fed to engine cylinders is controlled without changing the data $\theta_e$. After the step 234 or 235, a step 236 is executed to rewrite or renew the value of the prestroke time $\theta_R$. Namely, a corrected value of $\theta_R$ is written into the RAM 110. When the steps 230 through 236 are reapeatedly executed to correct or renew the prestroke time $\theta_R$ so that the actual idling engine speed N becomes close to the predetermined value Ni, undesirable deviation of the idling engine speed from the predetermined value Ni, which deviation is caused from mechanical variations in the engine or the fuel injection pump 1 or from secular change, is satisfactorily compensated for. Accordingly, the idling engine speed is readily set to the predetermined desired value Ni all the time. Although the feedback control steps 230 through 236 of FIG. 6 have been described as being provided between the steps 207 and 208, these feedback control steps 230-236 are not required to be executed at a high frequency such as once per a revolution of the engine crankshaft or once per a single fuel injection. Namely, the steps 230-236 may be executed in another interrupt service routine which is executed at a lower frequency, or in the main routine, for obtaining similar effects. Therefore, the feedback control for setting the idling engine speed does not result in a large load to the computer 9.

A third embodiment of the present invention will be described with reference to FIG. 7. This embodiment differs from the second embodiment of FIG. 6 in that the amount of fuel fed to respective cylinders of the engine is controlled independently of another. To this end the prestroke time $\theta_R$ is provided for respective cylinders. In the case of a four-cylinder engine, therefore, four prestroke time values $\theta_R(1)$, $\theta_R(2)$, $\theta_R(3)$ and $\theta_R(4)$ are used. In order to determine the value of each of the prestroke time values, a step 241 is added for ascertaining which cylinder is being subjected to fuel injection at present time. An additional crank angle sensor 13' is provided as shown in FIG. 8 showing a part of the fuel injection pump similar to that of FIG. 1. Namely, the crank angle sensor 13' produces a pulse when the plunger 2 or the face cam 3 makes a full turn, and sends the pulse to the computer 9. In detail, a single gear tooth or a projection 58 is provided to the plunger 2 so that the sensor 13' produces the pulse when facing the projection 58. On the other hand the bottom-dead center sensor 13 produces four pulses per a single rotation of the plunger 2 in the same manner as in previous embodiments. The projection 58 is positioned so that it indicates a specific cylinder of the engine. Since each cylinder receives fuel to effect combustion once per two revolutions of the engine crankshaft and the plunger 2 makes a full turn when the engine crankshaft rotates twice, the projection 58 indicates one of the four cylinders of the four-cylinder engine. It will be also understood that the rotational angle ratio between the crankshaft and the plunder 2 is to be changed in accordance with the number of cylinders.

In this way the computer 9 is informed that the specific cylinder is being subjected to fuel injection in receipt of the pulse signal from the crank angle sensor 13'. Once the specific cylinder is determined, since the firing order to the cylinders is predetermined and known, remaining cylinders may be determined in receipt of the pulse or pulses from the bottom-dead center sensor 13. In this way, one of the cylinders, which is subjected to fuel injection at the present time is determined in the step 241.

The four prestroke time values $\theta_R(1)$, $\theta_R(2)$, $\theta_R(3)$ and $\theta_R(4)$ are stored in given addresses of the RAM 90 so that each value can be selectively read out in the step 207. The set of steps 230-236 of FIG. 6 may be executed in the same manner as in the second embodiment for each cylinder so that the value of respective prestroke time data $\theta_R$ is corrected one after another. In the step 206, the prestroke time $\theta_R(i)$ is read out, wherein i is 1, 2, 3 or 4 specifying a cylinder, to be added to $\theta_e$ in the step 207. As the result of such control in which the prestroke time $\theta_R$ is differently set for each cylinder, the amount of fuel fed to the cylinders is uniform throughout all the cylinders. Therefore, even if there exists a variation in characteristics throughout respective fuel injection nozzles, the variation in fuel amount caused therefrom may be removed.

Figure 7:
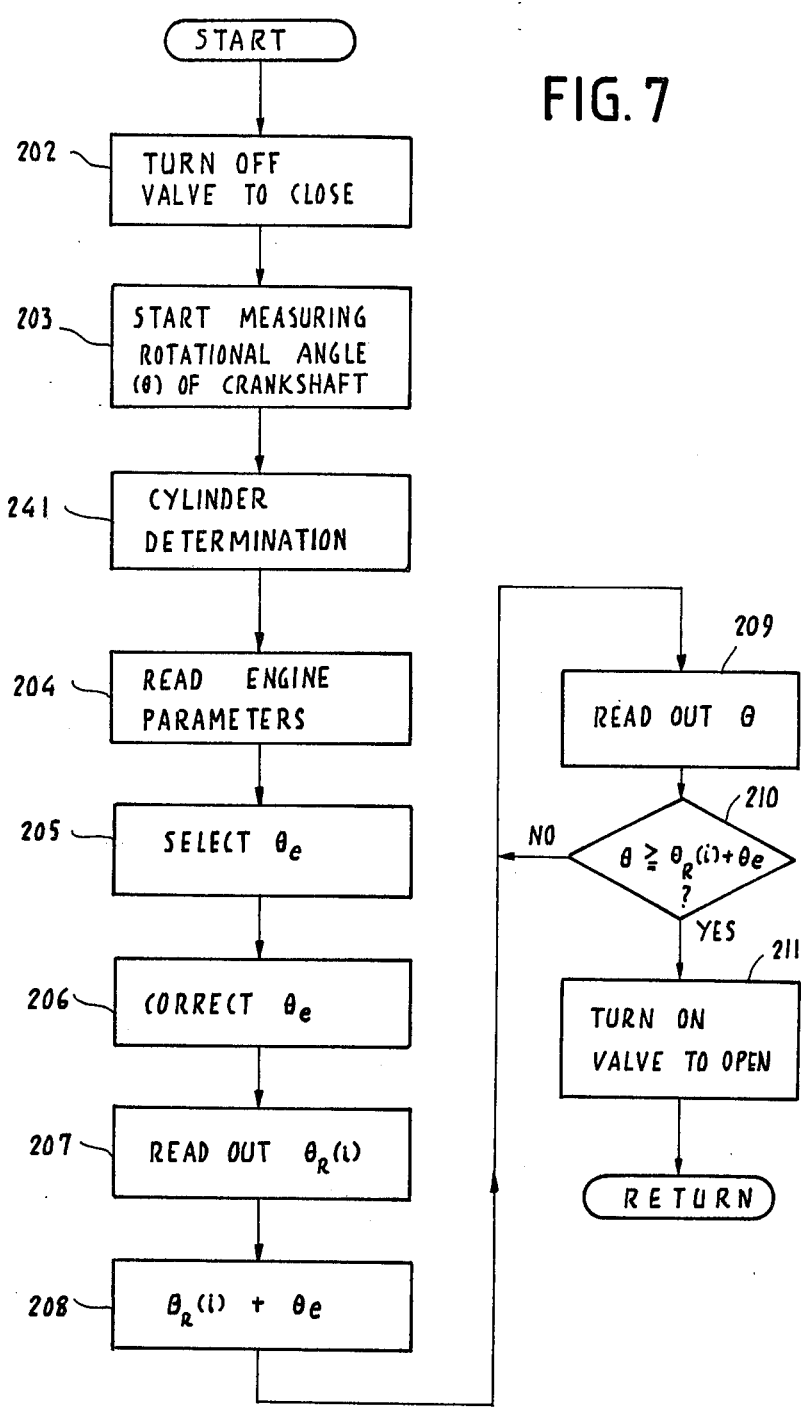
FIG. 7 is a flowchart showing a third embodiment of the invention.
Figure 8:
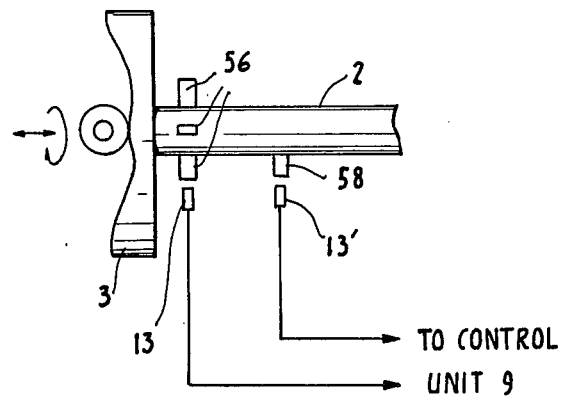
FIG. 8 is a diagram showing a crank angle sensor used in the third embodiment.

In the above-described second and third embodiments of FIGS. 6 and 7, although one or a plurality of prestroke time values are changed by a feedback control effected when the engine is in idling state, the feedback control for changing the value of $\theta_R$ is not limited to the above. Namely, such a feedback control may be effected unless the engine speed drastically varies. Furthermore, such a feedback control may be performed by using parameter or parameters other than the engine speed. This means that feedback controls, such as for reducing torque or engine speed variation, or for controlling the ratio between exhaust gas components, may be effected for renewing the prestroke time $\theta_R$. In other words, the steps 230-236 of FIG. 6 are just an example of a feedback control in which the value of $\theta_R$ is changed in accordance with detected engine parameter or parameters.

Figure 10:
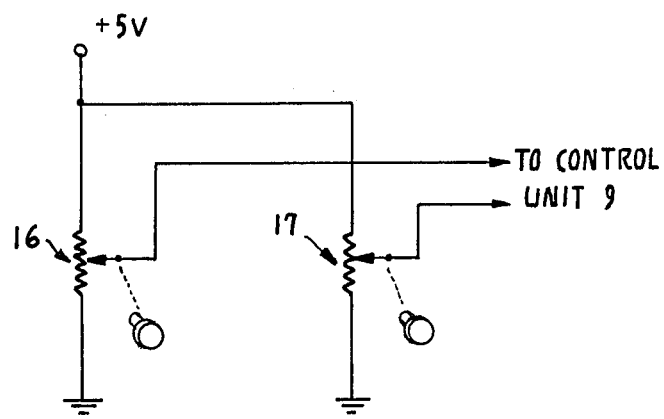
FIG. 10 is a diagram showing potentiometers used in the fourth embodiment.

A fourth embodiment will be described with reference to a flowchart of FIG. 9. The fourth embodiment differs from the above-embodiments in that the value of the prestroke time $\theta_R$, which may be uniformly set throughout all the cylinders or independently set for respective cylinders, is manually adjustable, and in that the sum time or sum angle $\theta_R + \theta_e$ is limited within a predetermined maximum value $\theta_{MAX}$ of the closing duration of the electromagnetic valve 8, which maximum value $\theta_{MAX}$ is stored in a memory. This memory may be a RAM used as the memory 90 of FIG. 4 so that both the prestroke time value $\theta_R$ and the maximum value $\theta_{MAX}$ are stored therein. This maximum vlaue $\theta_{MAX}$ represents an allowable maximum closing duration of the electromagnetic valve 8 so as to prevent the engine cylinders from being supplied with excessive fuel. This maximum value $\theta_{MAX}$ is originally stored in the RAM 90, and is manually adjustable. In order to manually adjust or change $\theta_R$ and $\theta_{MAX}$, therefore, a pair of potentiometers 16 and 17 are provided as shown in FIG. 10. The first potentiometer 16 is referred to as an idling adjusting resistor, while the second potentiometer 17 is referred to as a smoke limit adjusting resistor. These potentiometers 16 and 17 are manually adjustable so as to produce desired voltages which are respectively fed to the analog input port 84 of FIG. 4. In the illustrated embodiment, each of the potentiometers 16 and 17 is arranged to produce a voltage between 0 and 5 volts with the movement of a movable contact which is manually operable. These analog voltages are converted into digital data first, and the digital data is then converted into data with which the values of the prestroke time $\theta_R$ and the maximum value $\theta_{MAX}$ prestored in the RAM 90 are renewed respectively.

Turning back to FIG. 9, in the step 207 therefore, the value of $\theta_R$ which has been adjusted by the potentiometer 16 is now read out. Similarly in a step 300, which has been newly added in this embodiment, the value of $\theta_{MAX}$ adjusted by the potentiometer 17 is read out. The way of changing the values of $\theta_R$ and $\theta_{MAX}$ by way of the potentiometers 16 and 17 will be described later with reference to FIG. 11. In the flowchart of FIG. 9, in addition to the new step 300, three other new steps 302, 303 and 304 are added such that the steps 300 through 303 are interposed between the steps 208 and 211 of FIG. 5. Describing the function of these steps, in the step 301, the sum time or sum angle $\theta_R + \theta_e$ is compared with the maximum value $\theta_{MAX}$ to determine whether the former is equal to or smaller than the latter. This step 301 may be actualized by a step of substracting one value from the other, and another step of checking whether the difference resulted from the subtraction is equal to or greater than zero or not. When $\theta_R + \theta_e$ is equal to or smaller than $\theta_{MAX}$, the determination of the step 301 becomes YES, and a step 303 takes place in which the sum angle $\theta_R + \theta_e$ is unchanged. On the other hand, when $\theta_R + \theta_e$ is greater than $\theta_{MAX}$, a step 302 is executed to set the sum time to $\theta_{MAX}$. Namely, undesirably long closing duration of the electromagnetic valve 8 is limited by the maximum value $\theta_{MAX}$. After the completion of the step 302 or 303, the steps 209 through 211 are executed in the same manner as in previous embodiments so as to deenergize the electromagnetic valve 8 when the closing duration $\theta$ determined by the step 302 or 303 has been elapsed.

Figure 11:
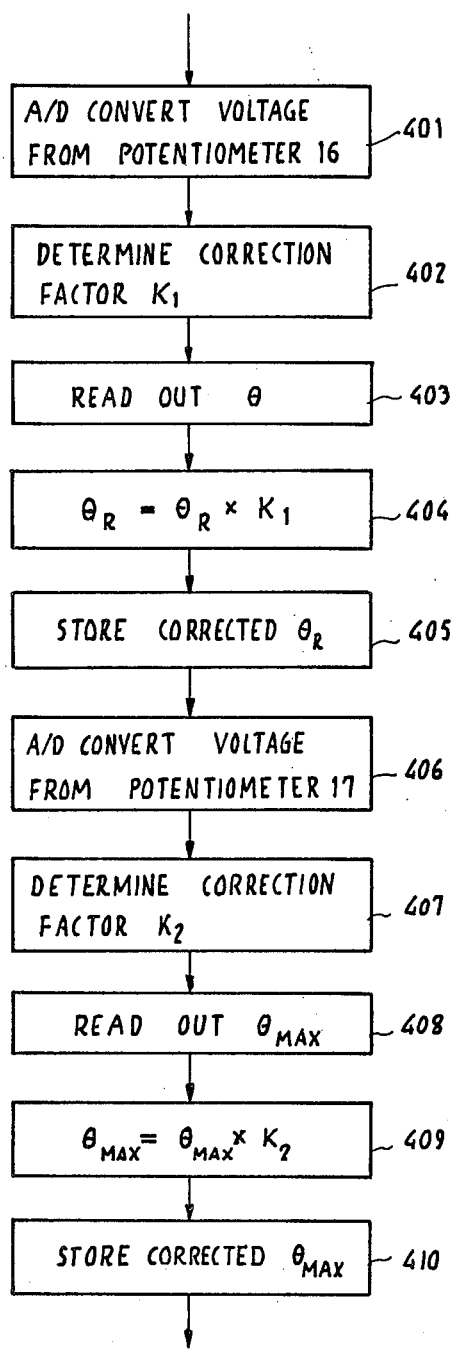
FIG. 11 is a flowchart showing the way of correcting prestroke time and the maximum value used in the flowchart of FIG. 8.

The way of changing the prestroke time $\theta_R$ and the maximum value $\theta_{MAX}$ of the closing duration will be described with reference to FIG. 11. The set of steps shown in a flowchart of FIG. 11 for the above renewal or resetting of $\theta_R$ and/or $\theta_e$ is not required to be performed at a high frequency such as once per a single fuel injection. Therefore, the steps of FIG. 11 may be executed by the unshown main routine or another interrupt service routine of lower frequency.

In a step 401, the analog voltage from the potentiometer 16, which is referred to as an idling adjusting resistor, is A/D converted by the analog input port 84. The digital output obtained by the A/D conversion is then converted, in a step 402, into a correction factor K which varies centering 1.0. Namely, when the movable contact of the potentiometer 16 is at the midway point producing 2.5 volt output, a correction factor $K_1$ indicating 1.0 is obtained. In this embodiment, when the analog voltage is 0 volt, the correction factor $K_1$ indicates 0.9, and when 5.0 volts, 1.1. In a step 403, the prestroke time $0_R$ is read out from the RAM 90 to be corrected by the correction factor $K_1$ in a following step 404. This correction is effected by multiplying $\theta_R$ by $K_1$. The corrected prestroke time $\theta_R$ is then stored into the RAM 90 to complete the correction. The following steps 406 through 410 are substantially identical with the above steps 401-405 so that the maximum value $\theta_{MAX}$ is corrected by another correction factor $K_2$ determined by the potentiometer 17. In this way, the values of $\theta_R$ and $\theta_{MAX}$ are respectively manually adjusted.

Figure 9:
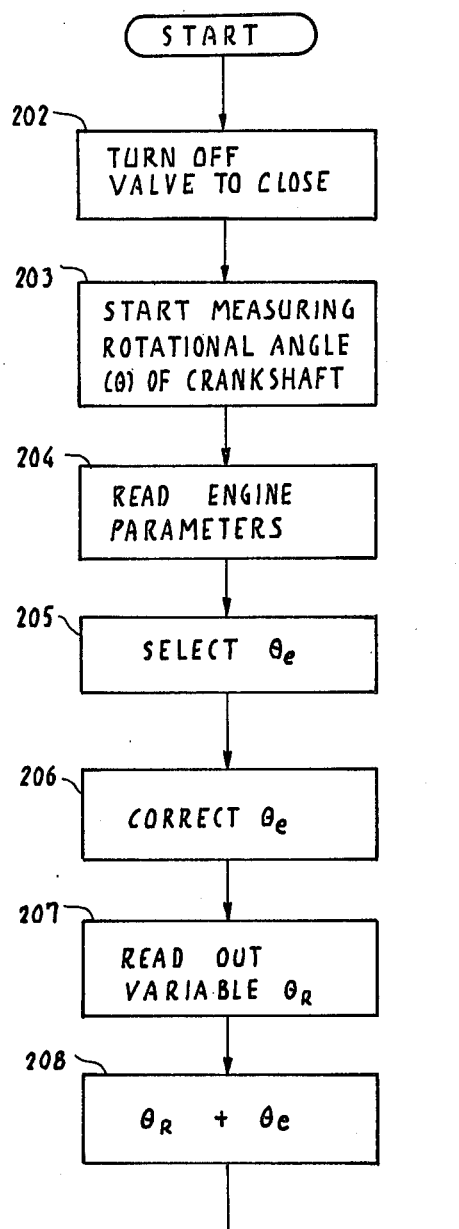
FIG. 9 is a flowchart showing a fourth embodiment of the invention.
Figure 9:
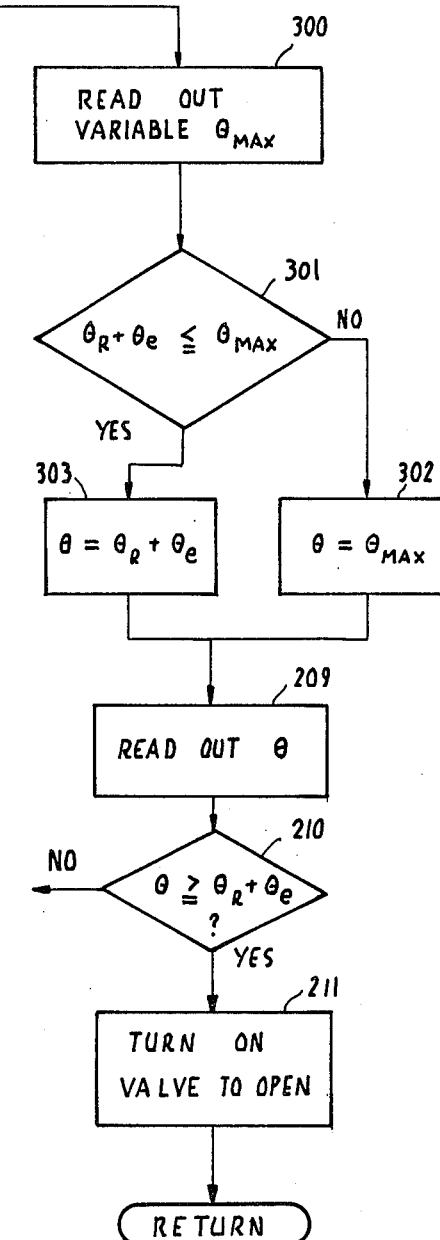

Since the values of the prestroke time $\theta_R$ and/or the maximum value $\theta_{MAX}$ are manually adjusted as described in the above, the adjusted values are read out and used in the flowchart of FIG. 9. As a result, both $\theta_R$ and $\theta_{MAX}$ may be desirably set so that the closing duration of the electromagnetic valve 8, and therefore the amount of fuel to be injected into engine cylinders is desirably controlled. When each of the potentiometers 16 and 17 are set so that their movable contacts remain at the midway point, the correction factors $K_1$ and $K_2$ equal 1.0. Under this condition, no correction or adjustment of $\theta_R$ and $\theta_e$ is made. In the case that the correction factor $K_1$ or $K_2$ is set to 0.9, the value of $\theta_R$ or $\theta_{MAX}$ is shortened by 10 percent since $\theta_R$ or $\theta_{MAX}$ is multiplied by 0.9. As a result, the subsequent fuel injection control is effected by using the shortened or decreased prestroke time $\theta_R$ and maximum value $\theta_{MAX}$. Therefore, the amount of fuel is decreased while the fuel injecting starting timing is made earlier than before. On the other hand, when the correction factor $K_1$ or $K_2$ is set to 1.1, $\theta_R$ or $\theta_{MAX}$ is lengthened by 10 percent, resulting in increase in the fuel amount. Since the correction factors $K_1$ and $K_2$ can be substantially continuously changed between 0.9 and 1.1 by the manipulation of the potentiometers 16 and 17, $\theta_R$ and $\theta_{MAX}$ may be desirably and arbitrarily set. As a result, the amount of fuel to be injected on idling can be manually controlled, while the maximum amount of fuel can also be manually controlled so that undesirable excessive flow of fuel is avoided. The adjustment of $\theta_{MAX}$ provides so called smoke limit setting.

Although the correction factors $K_1$ and $K_2$ have been described to vary between 0.9 and 1.1 to obtain a variation range of $\pm 10$ percent in the above embodiment, the value of the correction factors $K_1$ and $K_2$ is not limited to these examples. In addition, correction of $\theta_R$ and $\theta_{MAX}$ may be effected by way of addition or subtraction rather than multiplication.

Figure 12:
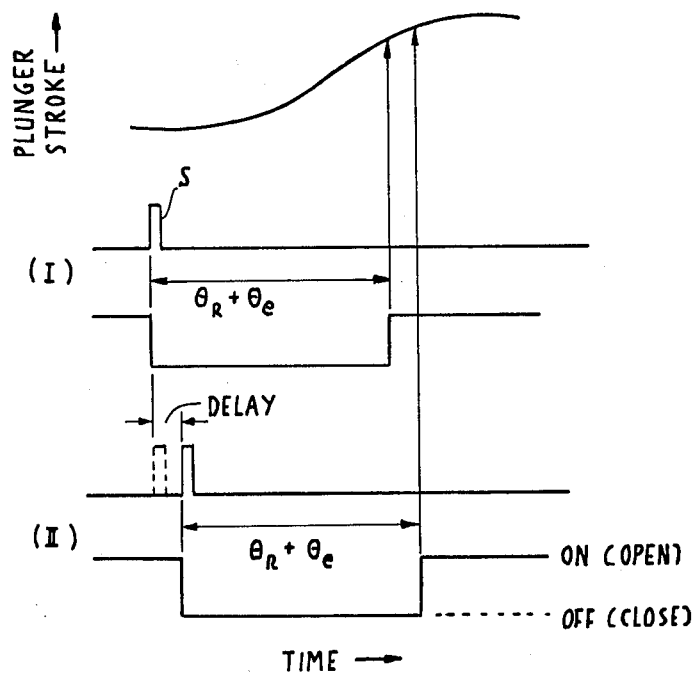
FIG. 12 is a timing chart showing a variation of the present invention.

In the previous embodiments, the electromagnetic valve 8 is deenergized to close the same immediately after the receipt of the bottom-dead center signal from the bottom-dead center signal sensor 13. However, deenergizing or valve-closing timing may be retarded appropriately from the instant of the occurrence of the bottom-dead center signal S as shown in FIG. 12. To this end, a delay circuit (not shown) may be employed for retarding the bottom-dead center signal or such a delay may be provided by measuring a predetermined time period by counting means which may be an additionally provided counter or a counter actualized by the operation of the CPU 80. In FIG. 12, (I) shows a nonretarded state, and (II) shows a retarded state. When the timing of closure of the electromagnetic valve 8 is retarded as shown in FIG. 12, the amount of fuel can be controlled because of the variation in the slope of the plunger stroke curve although the sum time $\theta_R + \theta_e$ is maintained unchanged.

Figure 13:
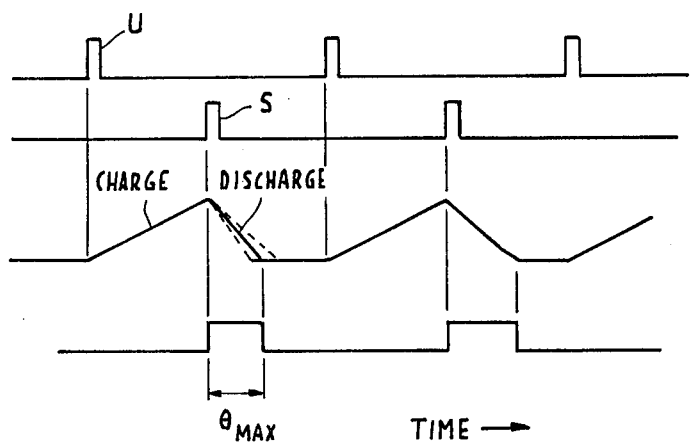
FIG. 13 is a timing chart showing another variation of the present invention.

In the above-described embodiment although the maximum value $\theta_{MAX}$ is set and adjusted by the operation of the computer 9, $\theta_{MAX}$ may be set and adjusted by way of an anlog circuit. One example of such an analog circuit is such that having a charging-discharging circuit with a capacitor and a resistor. An operational amplifier may additionally be used to constitute such a charging-discharging circuit. When such a charging-discharging circuit is used, a top-dead center sensor may be employed to produce a top-dead center signal U shown in FIG. 13. If desired, however, the top-dead center signal may be produced by using the bottom-dead center signal without employing such a top-dead center sensor. The capacitor of the charging-discharging circuit is charged for the duration defined between the top-dead center signal U and the bottom-dead center signal S, and then the charge stored in the capacitor is discharged in response to the bottom-dead center signal S. The discharging rate or the slope of the discharging curve may be manually adjusted by way of a potentiometer to produce a pulse signal having a desired width such that the voltage across the capacitor is compared with a reference voltage. This pulse width represents the aforementioned maximum value $\theta_{MAX}$ of the closing duration of the electromagnetic valve 8, and may be used in place of or together with the manually adjustable $\theta_{MAX}$ of FIG. 11. In the case that $\theta_{MAX}$ obtained by the charging-discharging circuit is used together with $\theta_{MAX}$ obtained by A/D conversion of FIG. 11, one of these two values of $\theta_{MAX}$, which is smaller than the other, is used so as to cause the electromagnetic valve 8 to open at an earlier timing for ensuring the prevention of undesirable excessive flow of fuel.

The above-described embodiments are just examples of the present invention, and therefore, it will be apparent for those skilled in the art that many modifications and variations may be made without departing from the spirit of the present invention.

What is claimed is:

1. Apparatus for controlling the amount of fuel supplied to an internal combustion engine, comprising:
   a fuel injection pump for injecting fuel under pressure;
   an electromagnetic valve operatively connected to said fuel injection pump for opening and closing a fuel passage through which pressurized fuel escapes so as to determine the amount of fuel injected from said pump;
   first means for detecting an operating condition of said engine;
   second means for detecting a reference position of a movable member of said fuel injection pump; and
   third means for controlling said electromagnetic valve in accordance with information from said first and second means, said third means including memory means for storing prestroke time data and actual injection time data respectively, said third means continuously detecting a successively increasing variable from the instant that said electromagnetic valve is closed, comparing said successively increasing variable with a value corresponding to the sum of said prestroke time and said actual injection time, which is determined on the basis of the engine operating condition, and opening said electromagnetic valve to terminate fuel injection when the former equals or exceeds the latter.

2. Apparatus as claimed in claim 1, wherein said third means is arranged to detect when said engine is in idling condition, to detect the engine speed, to compare said engine speed with a predetermined idling engine speed, and to either lengthen or shorten said prestroke time in accordance with the result of the comparison.

3. Apparatus as claimed in claim 1, wherein said third means is arranged to detect the engine operating condition with respect to respective cylinders of said engine, and to either lengthen or shorten said prestroke time, which is provided for respective cylinders, so that closing duration of said electromagnetic valve is controlled for each of said cylinders in a different manner.

4. Apparatus as claimed in claim 1, further comprising means for manually changing said prestroke time.

5. Apparatus as claimed in claim 1, wherein said third means is arranged to compare said value corresponding to the sum of said prestroke time and said actual injection time with a predetermined value which is prestored in a memory, and to limit the closing duration of said electromagnetic valve within a duration corresponding to said predetermined value.

6. Apparatus as claimed in claim 5, further comprising means for manually changing said predetermined value.

7. Apparatus as claimed in claim 1, wherein said first means comprises an engine speed sensor and an accelerator pedal position sensor so that said actual injection time is basically determined in accordance with information from these sensors by said third means; and an engine coolant temperature sensor and atmospheric pressure sensor so that said actual injection time is corrected in accordance with information from these sensors by said third means.

8. Apparatus as claimed in claim 1, wherein said second means comprises a bottom-dead center sensor producing a pulse when a plunger of said fuel injection pump assumes its bottom-dead point, so that said electromagnetic valve is closed in response to said pulse.

9. Apparatus as claimed in claim 1, wherein said fuel passage communicates between a spill port communicating with a compression chamber, and a fuel chamber of low pressure, so that communication between said spill port and said fuel chamber is established when said electromagnetic valve is opened.

10. A method for controlling the amount of fuel supplied to an internal combustion engine by means of a fuel injection pump which injects fuel under pressure, and an electromagnetic valve operatively connected to said fuel injection pump for opening and closing a fuel passage through which pressurized fuel escapes so as to determine the amount of fuel injected from said pump, said method comprising the steps of:
(a) detecting the operating condition of said engine;
(b) detecting a reference position of a movable member of said fuel injection pump;
(c) closing said electromagnetic valve in response to the detection of said reference position;
(d) continuously measuring a successively increasing variable from the instant of closure of said electromagnetic valve;
(e) determining actual injection time in accordance with detected engine operating condition;
(f) reading out prestroke time from a memory;
(g) obtaining a value corresponding to the sum of said actual injection time and prestroke time;
(h) comparing said successively increasing variable with said value corresponding to the sum of said actual injection time and prestroke time; and
(i) opening said electromagnetic valve when said variable equals or exceeds said value.

11. A method as claimed in claim 10, wherein the operating condition detecting step comprises a step of detecting the engine speed and the accelerator pedal position.

12. A method as claimed in claim 10, wherein the reference position detecting step comprises a step of detecting the bottom-dead center of a plunger of said fuel injection pump.

13. A method as claimed in claim 10, wherein the closing step comprises a step of closing said electromagnetic valve immediately after the detection of said reference position.

14. A method as claimed in claim 10, wherein the closing step comprises a step of closing said electromagnetic valve with a predetermined time delay from the instant of the detection of said reference position.

15. A method as claimed in claim 10, wherein the determining step comprises a step of selectively reading out actual injection time the values of which are prestored in the form of a map.

16. A method as claimed in claim 10, further comprising a step of correcting said prestroke time in accordance with engine operating condition.

17. A method as claimed in claim 10, wherein the reading out step and the sum-obtaining step are respectively executed for respective cylinders of said engine, with a plurality of prestroke time values being prestored in said memory.

18. A method as claimed in claim 10, further comprising a step of limiting the sum within a maximum value stored in a memory.

* * * * *